April 7, 1942.  K. SCHMITT  2,278,496
ELECTRICAL DISTRIBUTION SYSTEM
Filed June 22, 1939
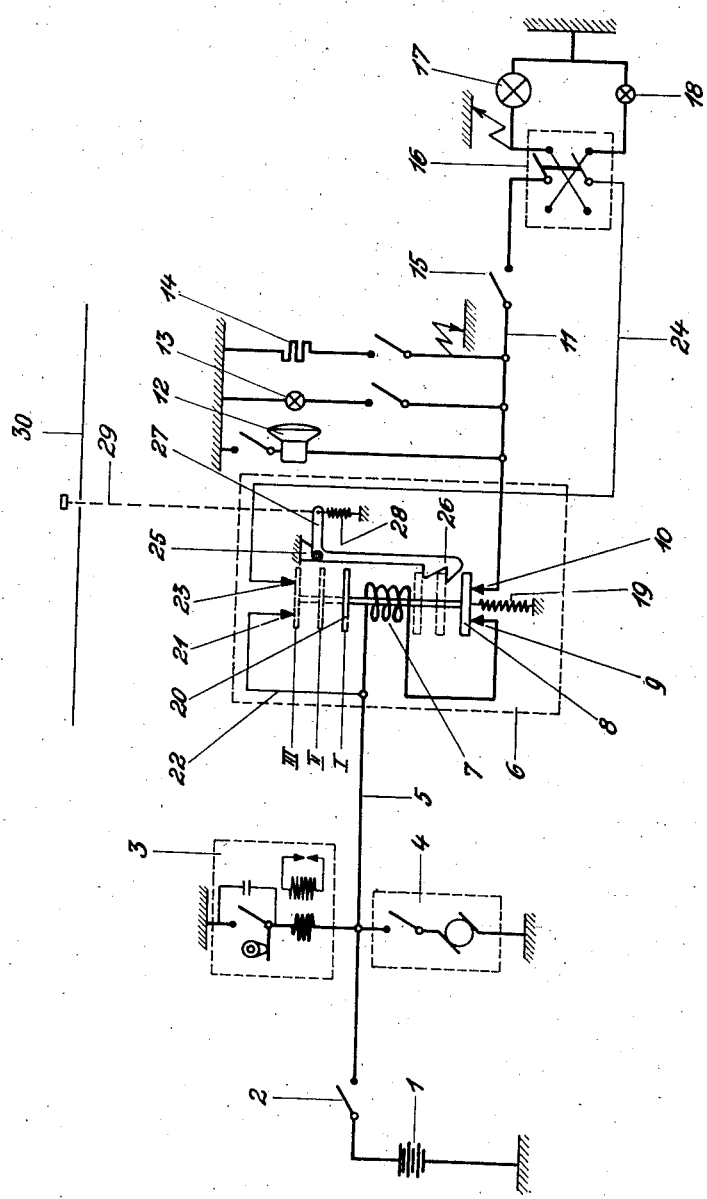
Inventor
KARL SCHMITT
By A. A. Hicks
 Attorneys Patented Apr. 7, 1942

2,278,496

UNITED STATES PATENT OFFICE 2,278,496

ELECTRICAL DISTRIBUTION SYSTEM

Karl Schmitt, Stuttgart-Degerloch, Germany, assignor to Dr. ing. h. c. F. Porsche K.-G., Stuttgart-Zuffenhausen, Germany, a company of Germany Application June 22, 1939, Serial No. 280,529
In Germany June 30, 1938

15 Claims. (Cl. 171—97)

This invention relates to an electrical distribution system, and more particularly to one for supplying current to a plurality of loads on an automobile or other vehicle.

An object of this invention is to provide an improved electrical distribution system for vehicles.

Another object of this invention is to provide an improved safety cut-out system, responsive to a short circuit in a vehicle electrical distribution system.

A further object of this invention is the provision of an improved safety cut-out and transfer switch.

A still further object is the provision of an improved safety lighting system for vehicles.

An additional object of this invention lies in the provision of an electrical distribution system having a plurality of loads, wherein a short circuit in any of said loads can be quickly, safely and easily located.

A more specific object of this invention is to provide a lighting system for vehicles, wherein a main light source is automatically cut out upon the occurrence of a short circuit in the electrical distribution system and simultaneously therewith an auxiliary light source is energized.

These and other features of the invention will be best understood and appreciated from the following description of a preferred embodiment thereof, described for purposes of illustration and shown in the accompanying drawing in which:

The single figure is a circuit diagram of a preferred embodiment of the improved electrical distribution system arranged in accordance with this invention.

As shown in the drawing, a suitable source of power, such as battery 1 is connected through the starting switch 2 to the usual ignition system of a vehicle engine, generally indicated at 3, and to the starter-generator 4. Power to the remaining loads is supplied from the battery 1 through the conductor 5 through the intermediation of an automatic switch 6, to be described in more detail hereinafter. In the illustrated position of the switch, current will flow from the conductor 5 through the actuating coil 7, the contact bridge 8, bridging contacts 9 and 10, and then to the conductor 11. Upon closure of the proper switches, diagrammatically indicated, current will flow from the conductor 11 to the horn 12, the instrument panel light 13, the lighter 14 or any other similar load such as clock, fan, radio, or the like. Upon closure of the switch 15, power is also supplied to the headlight circuit of the vehicle, consisting in the illustrated case of a reversing switch 16 for supplying power either to the main light source 17 or an auxiliary light source 18. The light sources 17 and 18 may be entirely separate lamps, or may consist of two lamps positioned in one headlight structure or may be separate filaments for a single lamp, all of which is well known in the art. The reversing switch 16 is used to connect either one or the other of the light sources to the main lighting and power circuits for the vehicle, depending upon the choice of the driver of the vehicle. The manner of operating the switch 16 is unimportant, this switch, for example, being hand-operated or foot-operated, as is also well known in the art.

In addition to contact members 8, 9 and 10 for the main loads of the electrical distribution system, the automatic switch is also supplied with a contacting bridge 20, which is adapted to bridge an additional pair of contacts 21 and 23. It will be seen that if this circuit is closed, power will flow from the energized conductor 5 and the conductor 22 through contacts 20, 21 and 23 and conductor 24 to the reversing switch 16 through which power may be supplied to light sources 17 or 18.

Pivoted upon a relatively stationary bracket 25 of the switch member 6, is a latch 26 which is adapted to hold the contacting switch 8 in either one of two raised positions. The latch 26 is also provided with an arm 27 acted upon by a spring 28 to urge the latch 26 toward its retaining position. A wire or cable 29 is provided for releasing the latch 26 in opposition to the force of the spring 28. The cable 29 may extend through the instrument board of the vehicle, generally indicated at 30, so that it can be easily and quickly actuated by the driver of the vehicle.

In order to show the operation of the aforedescribed system, let it be assumed that the necessary switches are closed to supply power to the various loads 12, 13 and 14, while switch 15 and reversing switch 16 are closed to place the main light source 17 in the main power circuit. The automatic switch 6 will under normal conditions remain in the position illustrated due to the force of the spring 19, which is sufficient to overcome the opposing force of the current coil during the normal flow of load current. If now a short circuit does occur in one of the main load circuits, such, for example, in the circuit of the lighter 14 or of the main light source 17 (as shown by the jagged arrows), the resulting high short circuit current will energize the actuating coil 7 of the automatic switch 6 to raise the contact bridge 8 from its engagement with the contacts 9 and 10 in opposition to the force of the spring 19 to such a position that it will be held by the upper notch of the latch 26. At the same time, the contact bridge 20 will engage the contacts 21 and 23 to energize the circuit connected to the auxiliary light source 18. It will be seen that the circuit for the auxiliary light source is entirely independent of the main distribution circuit which will be immediately de-energized by the disengagement of the contact bridge 8 from the contacts 9 and 10. Accordingly, one of the main objects and advantages of the present system is illustrated. As contrasted with the ordinary distribution system wherein one or more fuses provide a safety factor upon the occurrence of short circuit, but which, upon their blowing, will entirely cut out the supply of current, in the present case the occurrence of a short circuit, while cutting out the injured circuit, will additionally cut in an auxiliary circuit, so that, for example, in the case of night driving, the driver is always assured of having sufficient light to continue his journey. This, of course, is provided that both lighting circuits are not simultaneously short-circuited, which, however, would be a most unusual occurrence.

In the arrangement above described, it was assumed that the main light source 17, such, for example, as the bright headlight was connected by the reversing switch 16 to the main power circuit, while the auxiliary light source 18, such, for example, as the dim light was connected to the auxiliary distribution system. It is obvious, however, that through the reversing switch 16 the position of the light source 17 and 18 may be reversed, so that the light source 18, connected to the main distribution circuit will be cut out and the light source 17 cut in by the auxiliary contacts on the automatic switch 6.

After the short circuit has been removed, the system may be restored to its original condition by releasing the latch 26 through actuation of the wire or cable 29. The switch 6, however, also provides an easy manner for testing these circuits and a quick ascertaining of the short-circuit fault. If the latch 26 is released only to such an extent as to hold the contact bridge 8 in its intermediate position both the main and auxiliary circuits will be deenergized. If, while the switch is in this position, the various loads are disconnected and then individually reconnected the faulty device is soon discovered. Let it be assumed that the short circuit is in the lighter 14. If the horn switch is connected and the latch 26 released so that the contact bridge 8 will engage contacts 9 and 10 the switch will remain closed. If the dash-panel light switch 13 is closed still nothing will happen. However, when the lighter switch is closed the automatic switch 6 will again immediately operate indicating that the fault lies in the lighter circuit. Upon the occurrence of a fault the switch acts not only to automatically disconnect the faulty circuit, but the high currents flowing through the coil 7 will produce a buzzer effect thus, in addition giving an aural indication of the fault. It will thus be seen that the novel system arranged in accordance with this invention not only serves as a safety system, but as a means for readily testing the circuits, without blowing and consuming a large number of fuses as would be true in the systems heretofore used.

While not indicated as such, it is to be understood that each light source 17 and 18 may consist of a pair of lights on opposite sides of the vehicle in accordance with the usual arrangement upon automobiles.

It will be obvious to those skilled in this art that many modifications may be made in the arrangement above described, without departing from the spirit and scope of the invention. For example, the details of construction and mounting of the automatic switch may be greatly varied, so long as it will perform the necessary current-responsive cut-out and change-over functions. This switch may be mounted any place upon the vehicle; advantageously it may be mounted directly behind the instrument panel, where its release may be easily controlled by the driver. Furthermore, instead of two light sources in the strict sense, a single light source may be alternatively supplied from the main distribution circuit or through the auxiliary circuit. This will work unless a short circuit occurs in the light, in which case it will be necessary to additionally have a fuse in the auxiliary supply circuit. In a broad sense, it will also be apparent to those skilled in this art, that the present invention is not limited in its application specifically to electrical distribution systems for vehicles, but its principles are applicable to any distribution system in which it is important to maintain the energization of one type of load, despite the occurrence of a fault in other loads upon the system.

It will be seen therefore that I have provided a device which fulfills the objects primarily stated, and while I have shown a single embodiment of my invention, it is clear that other forms thereof may readily be provided without departing from my invention as defined in the following claims.

I claim:

1. In an electrical distribution system, a source of power, one or more main loads, an auxiliary load, and means for connecting said main load to said source of power, said means including further repeatedly usable means responsive to a predetermined current flow to said main loads for disconnecting said main loads from said source of power and substantially simultaneously connecting said auxiliary load to said source of power.

2. In an electrical distribution system for vehicles, a source of power, a pair of light sources for said vehicle, and means for connecting one of said light sources to said source of power, including further repeatedly usable means responsive to a predetermined increase in current to said one light source for disconnecting said one light source and substantially simultaneously connecting the other light source to the source of power.

3. The combination according to claim 2, in which said pair of light sources respectively comprise bright and dim headlight sources, in combination with a reversing switch for changing the relative connection of said bright and dim headlight sources with said connecting means and said source of power.

4. In an electrical distribution system, a source of power, one or more main loads, a switch having an actuating coil, contacts serially connected intermediate said source of power and said loads, means for normally holding said contacts closed in opposition to said actuating coil, an auxiliary load, and further normally open contacts on said switch intermediate said source of power and said auxiliary load, said switch including means responsive to a predetermined flow of current through said actuating coil for opening said normally closed contacts to disconnect said main load, and closing said normally open contacts to connect said auxiliary load to the source of power.

5. The combination according to claim 4, in which said switch includes further means for holding said switch in its actuated position to maintain said normally open contacts closed.

6. The combination according to claim 4, in which said switch includes further means for holding said switch in its actuated position to maintain said normally open contacts closed, in combination with means for releasing said switch from its actuated position to an intermediate position wherein both contacts thereof are open.

7. The combination according to claim 4, in which said switch includes further means for holding said switch in its actuated position to maintain said normally open contacts closed, in combination with means for releasing said switch from its actuated position to its original position upon cessation of said predetermined current flow.

8. In an electrical distribution system, a source of power, one or more main loads, an auxiliary load, and a switch for connecting said main and auxiliary loads to said source of power, comprising a current coil connected at one end to said source of power, a movable core adapted to be actuated by said coil, a pair of contact bridges movable with said core, a first pair of contacts adapted to be bridged by one of said contact bridges, and a second pair of contacts adapted to be bridged by the other of said contact bridges, means opposed to said actuating coil for normally maintaining said first pair of contacts closed by said one bridge and the other bridge removed from said second pair of contacts, a first conductor connecting the other end of said coil to one of said pair of first contacts, a second conductor connecting the other of said first pair of contacts to said main load, a third conductor connecting one of said pair of second contacts to said source of power, and a fourth conductor connecting the other of said second pair of contacts to said auxiliary load, whereby upon a predetermined flow of current through said coil, said one bridge will be removed from said pair of contacts to break the circuit to said main load, and the other bridge will close the second pair of contacts to connect the auxiliary load to the source of power.

9. The combination according to claim 8, in combination with a releasable latch adapted to engage one of said bridges upon movement thereof by said coil to hold the other of said bridges in engagement with the second pair of contacts against the force of said coil opposing means.

10. The combination according to claim 8, in combination with a releasable latch adapted to engage one of said bridges upon movement thereof by said coil to hold the other of said bridges in engagement with the second pair of contacts against the force of said coil opposing means, said latch being formed with a pair of notches, one of which will hold the other of said bridges in engagement with the second pair of contacts, and the other of which will hold the one bridge in an intermediate position against said coil opposing means, at which position neither bridge will engage its respective contacts, whereby the circuit to both the main and auxiliary loads will be broken.

11. The combination according to claim 8, in combination with a releasable latch adapted to engage one of said bridges upon movement thereof by said coil to hold the other of said bridges in engagement with the second pair of contacts against the force of said coil opposing means, said latch being formed with a pair of notches, one of which will hold the other of said bridges in engagement with the second pair of contacts, and the other of which will hold the one bridge in an intermediate position against said coil opposing means, at which position neither bridge will engage its respective pair of contacts, whereby the circuit to both the main and auxiliary loads will be broken, and means for moving said latch to permit release of the said one bridge from the one notch to the other notch or to its position of engagement with said first pair of contacts.

12. In an electrical distribution system for vehicles, a source of power, one or more main loads, one of which is a first headlight source, a second headlight source, switching means normally connecting said source of power with said main loads and responsive to a flow of current above a predetermined maximum for disconnecting said main loads and substantially simultaneously connecting said second headlight source to said source of power, and biasing means opposing the disconnecting action of said switching means.

13. The combination according to claim 12, in combination with means for automatically holding said switch means to maintain the connection to said second headlight source after the current flow drops below said predetermined maximum.

14. In an electrical distribution system for vehicles, a source of power, one or more main loads, one of which is a first headlight source, a second headlight source, switching means normally connecting said source of power with said main load and responsive to a flow of current above a predetermined maximum for disconnecting said main load and substantially simultaneoulsy connecting said second headlight source to said source of power, means for automatically holding said switching means to maintain the connection to said second headlight source after the current flow drops below said predetermined maximum, and hand-operated means for releasing said automatic means to permit the return of said switching means to its normal connecting position after the current flow drops below said predetermined maximum.

15. In an electrical distribution system, a source of power, one or more main loads, an auxiliary load, and a unitary switching device connecting said main load to said source of power and having means responsive to a predetermined current flow to said main load for disconnecting said main load from said source of power and substantially simultaneously connecting said auxiliary load to said source of power.

KARL SCHMITT.